(12) United States Patent
Shen et al.

(10) Patent No.: US 8,495,635 B2
(45) Date of Patent: *Jul. 23, 2013

(54) MECHANISM TO ENABLE AND ENSURE FAILOVER INTEGRITY AND HIGH AVAILABILITY OF BATCH PROCESSING

(75) Inventors: Jinmei Shen, Rochester, MN (US); Hao Wang, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/551,184

(22) Filed: Jul. 17, 2012

(65) Prior Publication Data
US 2012/0284557 A1 Nov. 8, 2012

Related U.S. Application Data

(63) Continuation of application No. 12/103,886, filed on Apr. 16, 2008, now Pat. No. 8,250,577.

(51) Int. Cl.
*G06F 9/455* (2006.01)
(52) U.S. Cl.
USPC .......................................................... 718/101
(58) Field of Classification Search
None
See application file for complete search history.

(56) References Cited

U.S. PATENT DOCUMENTS

| | | | | |
|---|---|---|---|---|
| 5,796,934 | A * | 8/1998 | Bhanot et al. ................ | 714/4.12 |
| 7,406,688 | B2 * | 7/2008 | Shibayama et al. .......... | 718/102 |
| 2002/0161814 | A1 * | 10/2002 | Wical ............................ | 709/101 |
| 2003/0225760 | A1 * | 12/2003 | Ruuth et al. ...................... | 707/5 |
| 2005/0198636 | A1 * | 9/2005 | Barsness et al. ............... | 718/100 |
| 2007/0220516 | A1 * | 9/2007 | Ishiguro et al. ................ | 718/101 |
| 2007/0260696 | A1 * | 11/2007 | Bohannon et al. ............. | 709/208 |
| 2008/0005745 | A1 * | 1/2008 | Kureya et al. .................. | 718/106 |
| 2008/0010641 | A1 * | 1/2008 | Zhao et al. ..................... | 718/101 |
| 2008/0109815 | A1 * | 5/2008 | Murata .......................... | 718/105 |
| 2009/0157766 | A1 * | 6/2009 | Shen et al. ..................... | 707/202 |

OTHER PUBLICATIONS

U.S. Appl. No. 12/103,886, filed Apr. 16, 2008 entitled "Mechanism to Enable and Ensure Failover Integrity and High Availability of Batch Processing"; Non-final office action dated Jun. 13, 2011.
U.S. Appl. No. 12/103,886, filed Apr. 16, 2008 entitled "Mechanism to Enable and Ensure Failover Integrity and High Availability of Batch Processing"; Final office action dated Oct. 14, 2011.
U.S. Appl. No. 12/103,886, filed Apr. 16, 2008 entitled "Mechanism to Enable and Ensure Failover Integrity and High Availability of Batch Processing"; Notice of Allowance dated Apr. 13, 2012.

* cited by examiner

*Primary Examiner* — Jacob A Petranek
(74) *Attorney, Agent, or Firm* — Dillon & Yudell LLP

(57) ABSTRACT

A method, system and computer program product manages a batch processing job by: partitioning the batch processing job for execution in a plurality of batch execution servers from a cluster of computers; designating one computer from the cluster as a primary command server that oversees and coordinates execution of the batch processing job; selecting a second computer from the cluster to serve as a failover command server; storing an object data grid structure in the primary command server; replicating the object grid structure to create and store a replicated object grid structure in the failover command server; in response to the primary command server failing, restarting, by the failover command server, execution of batch processes from the batch processing job in the plurality of batch execution servers utilizing objects within the replicated object grid structure, and executing the batch processes with processing states at the time of the failover.

17 Claims, 5 Drawing Sheets

MECHANISM TO ENABLE AND ENSURE FAILOVER INTEGRITY AND HIGH AVAILABILITY OF BATCH PROCESSING

PRIORITY CLAIM

The present application is a continuation of and claims priority from U.S. patent application Ser. No. 12/103,886, filed on Apr. 16, 2008, now U.S. Pat. No. 8,250,577 titled "Mechanism to Enable and Ensure Failover Integrity and High Availability of Batch Processing," which is incorporated by reference herein in its entirety and for all purposes.

BACKGROUND OF THE INVENTION

The present disclosure relates to the field of computers, and specifically to software. Still more specifically, the present disclosure relates to batch processing jobs.

The two main types of computer program execution are known as interactive processing (or transaction processing) and batch processing. Interactive processing, as the name implies, requires a user to enter data, which is processed by computer instructions. Batch processing is the execution of a series of programs ("jobs") on a computer without human interaction, since all data is already packaged in the programs.

Batch processing, as well as bundling sections of code, makes processing integrity and failover and high availability (processing backup) difficult, especially when clusters of computers are used to perform the batch processing. That is, if a cluster of computers are used to process a batch job, coordinating the operations of the clustered computers is difficult, if not impossible, particularly if a supervisory server should fail.

BRIEF SUMMARY OF THE INVENTION

A method, system and computer program product for managing a batch processing job is presented. The method includes partitioning a batch processing job for execution in a cluster of computers. One of the computers from the cluster of computers is designated as a primary command server that oversees and coordinates execution of the batch processing job. Stored in an object data grid structure in the primary command server is an alarm setpoint, boundaries, waiting batch processes and executing batch process states. The object data grid structure is replicated and stored as a replicated object grid structure in a failover command server. In response to the primary command server failing, the failover command server freezes all of the currently executing batch processes, interrogates processing states of the cluster of computers, and restarts execution of the batch processes in the cluster of computers in accordance with the processing states of the cluster of computers and information from the replicated object grid structure.

The above as well as additional objectives, features, and advantages of the present invention will become apparent in the following detailed written description.

BRIEF DESCRIPTION OF THE SEVERAL VIEWS OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF THE INVENTION

Figure 1:
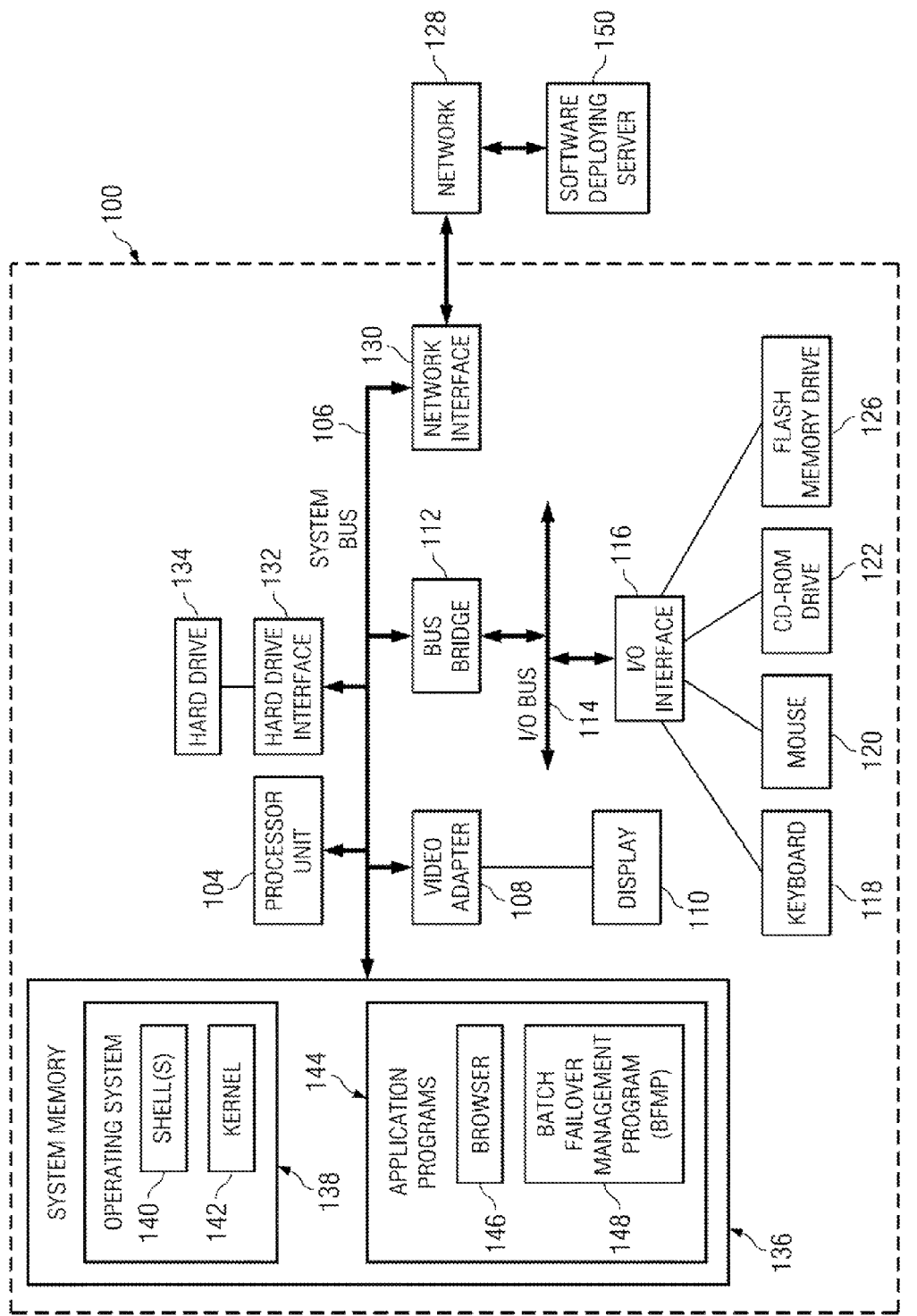
FIG. 1 depicts an exemplary physical computer in which the present invention may be implemented.

As will be appreciated by one skilled in the art, the present invention may be embodied as a method, system, or computer program product. Accordingly, the present invention may take the form of an entirely hardware embodiment or an embodiment combining software (including firmware, resident software, micro-code, etc.) and hardware aspects that may all generally be referred to herein as a "circuit," "module" or "system." Furthermore, the present invention may take the form of a computer program product on a computer-usable storage device having computer-usable program code embodied in the device Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable devices would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present invention may be written in an object oriented programming language such as Java® (Java® is a trademark or registered trademark of Sun Microsystems, Inc. in the United States and other countries), Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatuses (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory/device that can direct a computer or other programmable data processing apparatus to function in a particular manner, such that the instructions stored in the computer-readable memory/device produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

With reference now to FIG. 1, there is depicted a block diagram of an exemplary computer 100, with which the present invention may be utilized. The architecture for computer 100 may be utilized by software deploying server 150, as well as primary command server 202, batch execution servers 204a-n, and/or failover command server 214 shown in FIG. 2. Computer 100 includes a processor unit 104 that is coupled to a system bus 106. A video adapter 108, which drives/supports a display 110, is also coupled to system bus 106. System bus 106 is coupled via a bus bridge 112 to an Input/Output (I/O) bus 114. An I/O interface 116 is coupled to I/O bus 114. I/O interface 116 affords communication with various I/O devices, including a keyboard 118, a mouse 120, a Compact Disk—Read Only Memory (CD-ROM) drive 122, and a flash memory drive 126. The format of the ports connected to I/O interface 116 may be any known to those skilled in the art of computer architecture, including but not limited to Universal Serial Bus (USB) ports.

Computer 100 is able to communicate with a server 150 (as well as any other computer/server) via a network 128 using a network interface 130, which is coupled to system bus 106. Network 128 may be an external network such as the Internet, or an internal network such as an Ethernet or a Virtual Private Network (VPN).

A hard drive interface 132 is also coupled to system bus 106. Hard drive interface 132 interfaces with a hard drive 134. In one embodiment, hard drive 134 populates a system memory 136, which is also coupled to system bus 106. System memory 136 is defined as a lowest level of volatile memory in computer 100. This volatile memory may include additional higher levels of volatile memory (not shown), including, but not limited to, cache memory, registers, and buffers. Code that populates system memory 136 includes an operating system (OS) 138 and application programs 144.

OS 138 includes a shell 140, for providing transparent user access to resources such as application programs 144. Generally, shell 140 is a program that provides an interpreter and an interface between the user and the operating system. Shell 140 provides a system prompt, interprets commands entered by keyboard 118, mouse 120, or other user input media, and sends the interpreted command(s) to the appropriate lower levels of the operating system (e.g., kernel 142) for processing. As depicted, OS 138 also includes kernel 142, which includes lower levels of functionality for OS 138. Kernel 142 provides essential services required by other parts of OS 138 and application programs 144. The services provided by kernel 142 include memory management, process and task management, disk management, and I/O device management.

Application programs 144 include a browser 146. Browser 146 includes program modules and instructions enabling a World Wide Web (WWW) client (i.e., computer 100) to send and receive network messages to the Internet. Computer 100 may utilize HyperText Transfer Protocol (HTTP) messaging to enable communication with server 150 and/or any other computer. Application programs 144 in system memory 136 also include a Batch Failover Management Program (BFMP) 148, which executes the steps described below in FIGS. 2-5, and comprises the object grid data structure 212 and/or the replicated object grid data structure 216 described below in FIG. 2.

In one embodiment, computer 100 is able to download BFMP 148 from a remote service provider server 150, preferably in an "on demand" basis. In another embodiment, server 150 is able to execute BFMP 148, thus reducing demand on hardware and software resources directly attributed to computer 100.

The hardware elements depicted in computer 100 are not intended to be exhaustive, but rather are representative to highlight essential components required by the present invention. For instance, computer 100 may include alternate memory storage devices such as magnetic cassettes, Digital Versatile Disks (DVDs), Bernoulli cartridges, and the like. These and other variations are intended to be within the spirit and scope of the present invention. Note that the hardware architecture for service provider server 150 may be substantially similar to that shown for computer 100.

Figure 2:
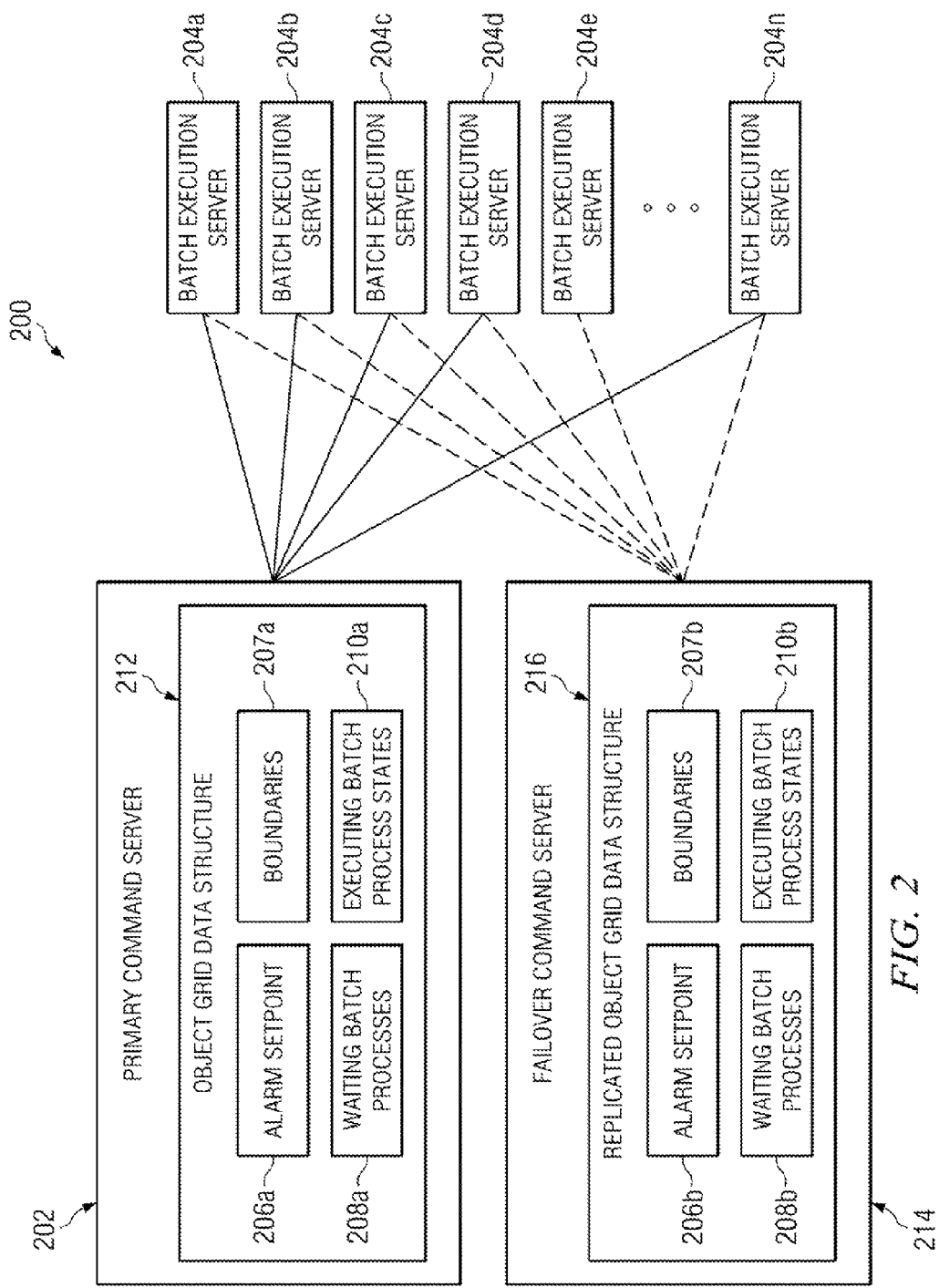
FIG. 2 illustrates a cluster of batch execution servers under the control of a primary command server.

Referring now to FIG. 2, a cluster of computers 200 used when executing and managing batch processing in a high availability/failover manner is depicted. The cluster of computers 200 includes a primary command server 202, which has been selected from the cluster of computers 200 to oversee batch processing operation by a plurality of batch execution servers 204a-n (when "n" is an integer). The plurality of batch execution servers 204a-n have been selected from (carved out of) the cluster of computers 200 to perform the actual batch execution processing of batch processes. A failover command server 214 is also carved out of the cluster of computers 200.

Stored within the primary command server 202 is an object grid data structure 212, which includes an alarm setpoint 206a, boundaries 207a, waiting batch processes 208a and executing batch process states 210a. Alarm setpoint 206a describes a quantity of accumulated unexecuted work units, in the batch processing job, which will cause an alarm to be generated. Boundaries 207a describe where the batch processing job can be stored in a system memory in the primary command server. Waiting batch processes 208a describe waiting batch processes in the batch processing job that are not executing. Executing batch process states 210a comprise contents of hard and soft architecture states of computers, from the cluster of computers, that are processing currently executing batch processes from the batch processing job. These hard and soft architecture states include contents of General Purpose (GP) registers, instruction caches, data caches and other registers/caches within a processor core that, when loaded in the processor core, permit execution of the batch process.

The object grid data structure 212 is replicated to create a replicated object grid data structure 216, and thus includes an alarm setpoint 206b, boundaries 207b, waiting batch processes 208b and executing batch process states 210b, which respectively are real-time copies of alarm setpoint 206a, boundaries 207a, waiting batch processes 208a and executing batch process states 210a. In one embodiment, the replicated object grid data structure 216 is replicated/updated at predetermined times (e.g., every second), or whenever a change in any of the objects (e.g., the executing batch process states 210a) change. Note that the executing batch process states 210a are determined by routine and periodic (e.g., every second) interrogation of the hard and soft states of the batch execution servers 204a-n. Thus, the updating of the object grid data structure 212 and the updating of the replicated object grid data structure 216 is preferably coordinated in a manner such that the replicated object grid data structure 216 always has a most-current copy of data found in the original object grid data structure 212.

Figure 3:
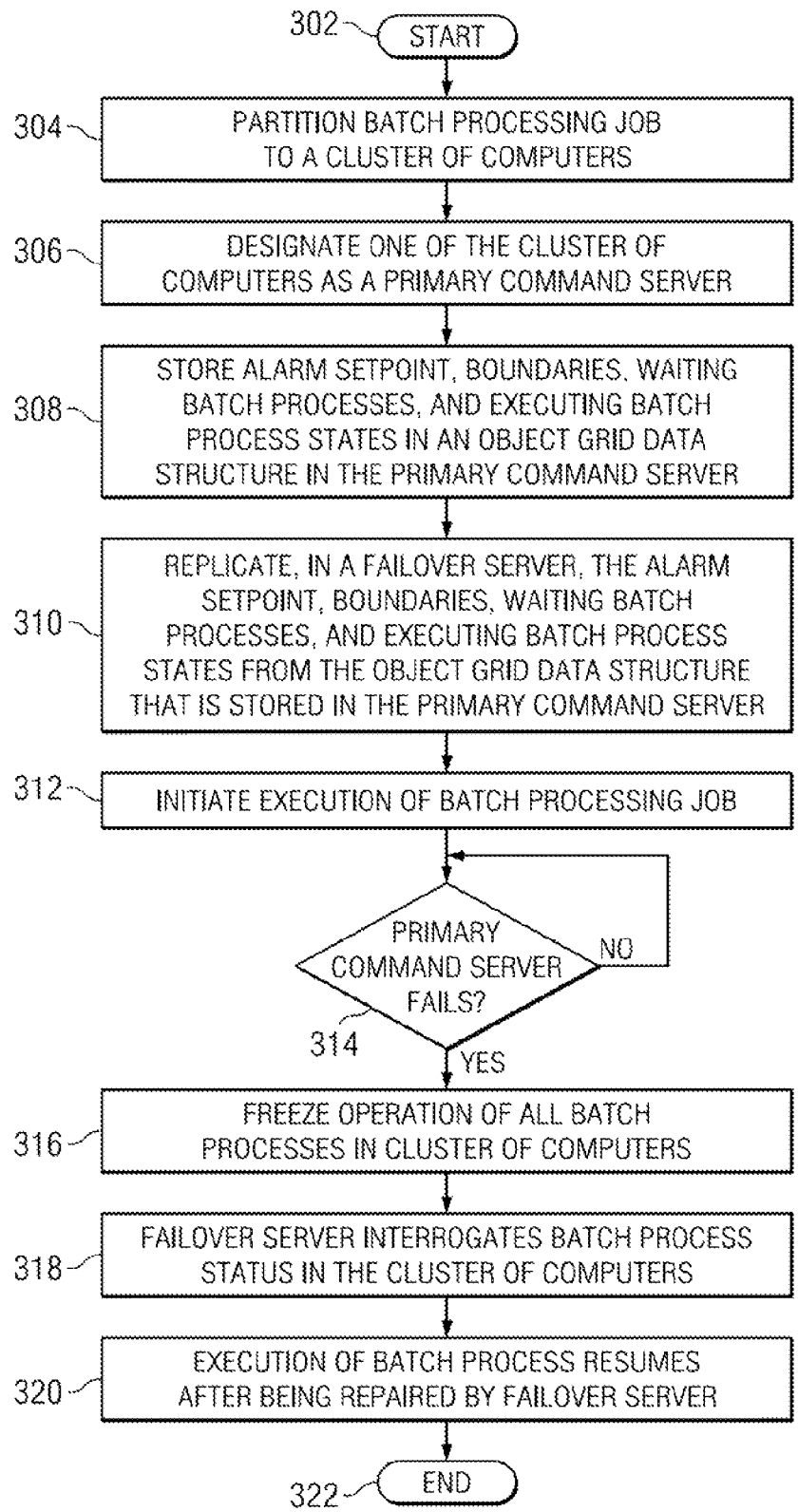
FIG. 3 is a high-level flow-chart of exemplary steps taken by the present invention to handle a failure of the primary command server shown in FIG. 2.

With reference now to FIG. 3, a high-level flow chart of steps taken to manage a batch processing job is presented. After initiator block 302, a batch processing job is partitioned for execution in a plurality of batch execution servers carved out from a cluster of computers (block 304). One of the computers from the cluster of computers is designated as a primary command server (block 306). The primary command server oversees and coordinates execution of the batch processing job being performed in multiple batch execution servers. Stored in the primary command server, as an object grid data structure, are an alarm setpoint, boundaries, waiting batch processes and executing batch process states (block 308). The alarm setpoint describes a quantity of accumulated unexecuted work units, in the batch processing job, which will cause an alarm to be generated. The boundaries describe where the batch processing job can be stored in a system memory in the primary command server. The boundaries can be subdivided into accounts boundaries, transaction boundaries and physical size boundaries. Accounts boundaries define locations in the system memory for listing customers who are utilizing the batch processing job; transaction boundaries define locations in the system memory in which batch processes are prohibited from being stored; and physical size boundaries define where the batch processes are stored in system memory. The waiting batch processes describe waiting batch processes in the batch processing job that are not executing. The executing batch process states include contents of hard and soft architecture states of computers, from the cluster of computers, that are processing currently executing batch processes from the batch processing job. The hard and soft architecture states are also referred to as processor states. The state of a processor (processor state) includes stored data, instructions and hardware states at a particular time, and are herein defined as either being "hard" or "soft." The "hard" state is defined as the information within a processor that is architecturally required for a processor to execute a process from its present point in the process. The "soft" state, by contrast, is defined as information within a processor that would improve efficiency of execution of a process, but is not required to achieve an architecturally correct result. Thus in a core of processor unit 104 (shown and described above in FIG. 1), the "hard" state includes the contents of user-level registers, such as a Condition Register (CR), a Link and Count Register (LCR), General Purpose Registers (GPRs) and Floating Point Registers (FPRs). The "soft" state of the core of processor unit 104 includes both "performance-critical" information, such as the contents of a Level-1 Instruction-cache, a Level-1 Data-cache, as well as address translation information found in buffers and tables such as a Data Translation Lookaside Buffer (DTLB) and an Instruction Translation Lookaside Buffer (ITLB), as well as less critical information found in a Branch History Table (BHT) and/or all or part of the content of Level-2.

Continuing with the description of FIG. 3, as described in block 310, the object grid structure is replicated to create a replicated object grid structure in a failover command server. As described above, the failover command server is a server selected from the cluster of computers. Execution of the batch processing job then beings in the multiple batch execution servers (block 312). In one embodiment, each batch process from the batch processing job initially executes in multiple computers from the multiple batch execution servers, while in another embodiment, each batch process from the batch processing job initially executes in only one of the batch execution servers. Furthermore, in one embodiment, the batch processing job is performed on a bundle of execution files, wherein each of the execution files includes multiple individual instructions. Thus, the bundled execution files are first unbundled, and then the unbundled execution files are assigned to a different computer or set of computers from the batch execution servers.

As described in query block 314, in response to the primary command server failing, all of the currently executing batch processes in the cluster of computers are frozen (block 316). Freezing of these currently executing batch processes is performed by the failover command server. As described in block 318, the failover command server then interrogates the batch execution servers for their hard and soft architected processing states. If the interrogation of the architected processing states indicates that there has been damage to the processing of a batch process execution, the failover command server repairs the architected states and/or the batch process instructions, and then restarts execution of the batch processing job in accordance with the (repaired) processing states of the cluster of computers (block 320). The process ends at terminator block 322.

In addition to partitioning large jobs into smaller batches for execution by different computers, as described above, the present invention also contemplates bundling smaller tasks into bundled jobs for efficient processing. This process of bundling permits enterprise systems to process many client requests, each being relatively small, into a larger bundle according to boundaries such as similar type of requests, from same kinds of clients, within related transactions, number of requests per batch, etc.

Figure 4:
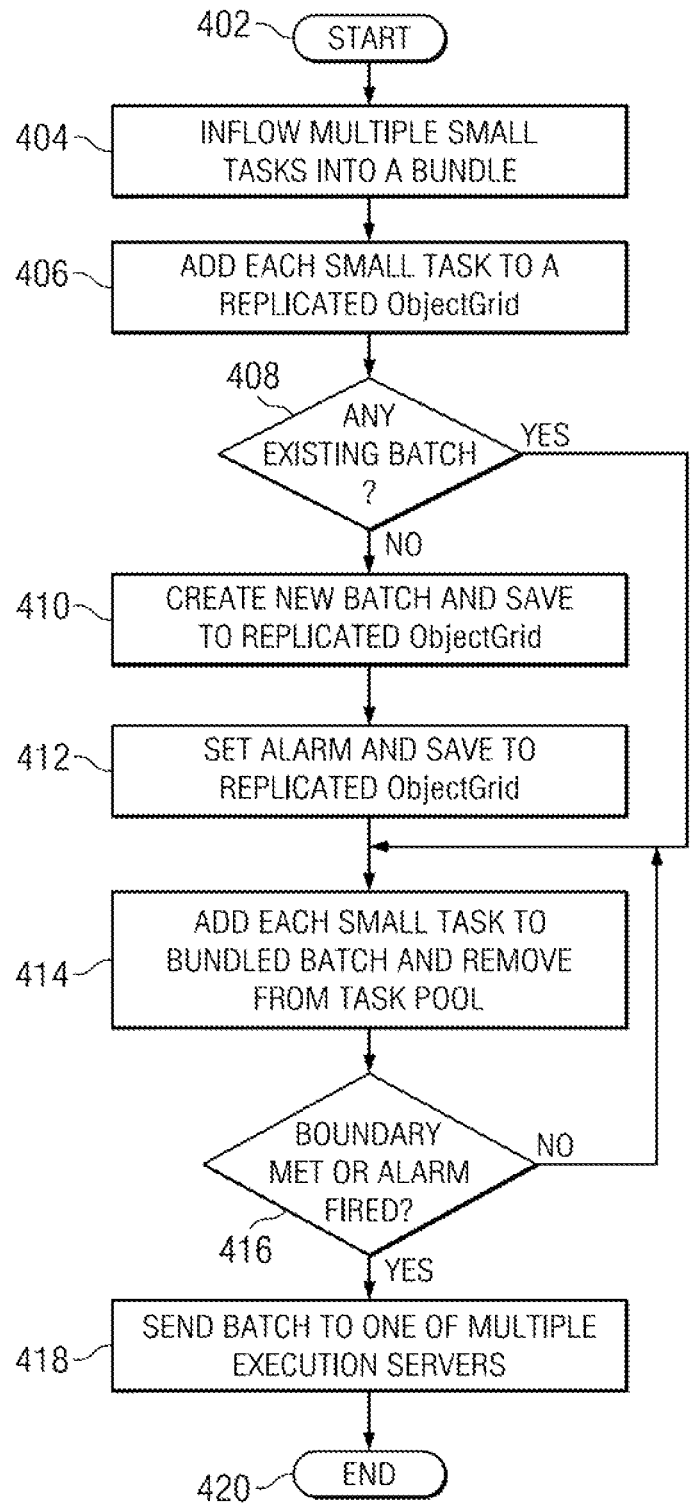
FIG. 4 depicts steps taken to bundle small batch jobs for execution by the cluster of batch execution servers shown in FIG. 2.

In addition to partition large job into small batches for clustered batch processing as described above, the present invention is also useful when incorporated into a bundling small tasks into large batches for efficient processing. Referring now to FIG. 4, after initiator block 402, similar small tasks are continuously received for inflow into a bundle by a primary command server (block 404). The primary command server bundles small tasks into batches by either physical boundaries (such as accounts, type, transactions, clients) or by time period (for example, preferably during some predetermined period of time (e.g., bundle five minutes of inflow of small tasks as a large batch to be sent to an execution server cluster). As the small tasks continuously inflow into the command server, all such small tasks are added to a replicated ObjectGrid repository that describes the small tasks (block 406). This ObjectGrid repository, as described in detail below in FIG. 5, will be used if the small tasks are lost when the primary command server fails. As depicted in query block 408, a query is made to determine if there is a batch in the processing of bundling. If so, then the incoming small tasks are bundled and removed from the incoming pool of tasks (block 414) until the current batch reaches its physical boundary or an alarm is fired (query block 416), at which point the bundled batch is sent to one of the multiple execution servers (block 418). However, if an existing bundle batch does not exist (query block 408), then a new batch bundle is created and saved to a new replicated ObjectGrid (block 410) and a new alarm is set in that new replicated ObjectGrid (block 412). The process continues in an iterative manner until no further tasks are incoming, and/or the command servers are stopped (terminator block 420).

Figure 5:
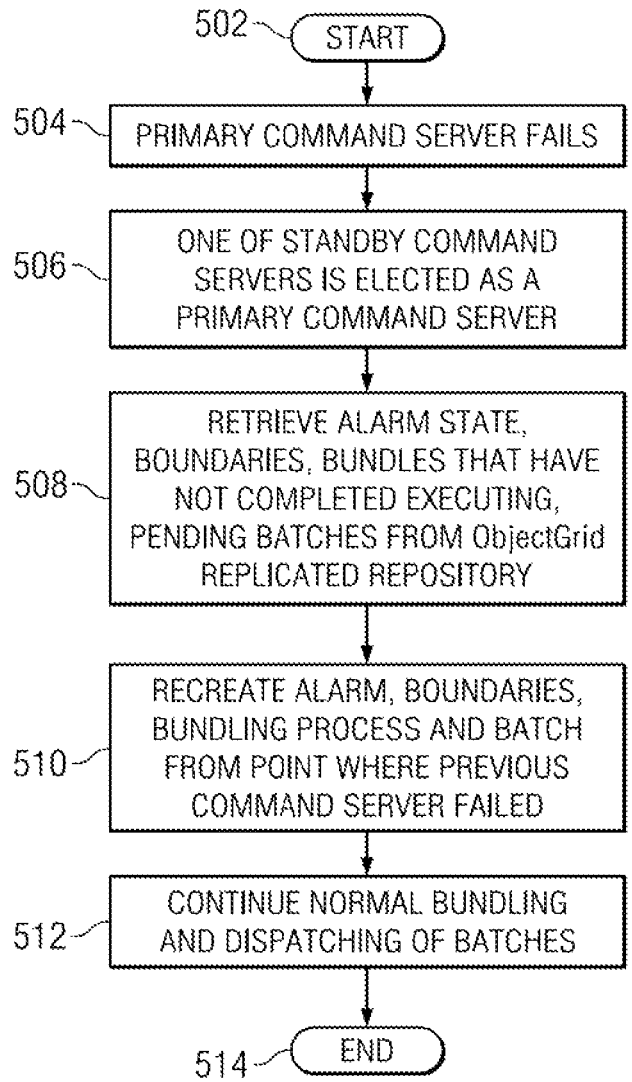
FIG. 5 illustrates handling failover during bundling and execution processes of small batch jobs.

During any point of the bundling batch and dispatching processes shown in FIG. 4, a primary command server may fail, leave half done bundling and half finished batch processing. Thus, as shown in FIG. 5, after initiator block 502, one of the primary command servers may fail (block 504). If so, then one of standby command servers is elected as a primary command server (block 506). The new primary command server will then retrieve half done states from a replicated ObjectGrid, recreate alarms that were set but not fired yet before previous command server fails (block 508), and recreate half done bundling and batches so that new command server will start from this point exactly where previous command server failed (block 510). Using recreated information from the replicated ObjectGrid, the new command server will continue normal bundling and dispatching of batches to execution servers (block 512) until the process ends (terminator block 514).

Note that the flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/ or components, but do not preclude the presence or addition of one or more other features, integers, steps, operations, elements, components, and/or groups thereof The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to preferred embodiments thereof, it will be apparent that modifications and variations are possible without departing from the scope of the invention defined in the appended claims.

What is claimed is:

1. A method of managing a batch processing job, the method comprising:
    bundling a set of small batch jobs into a large bundled job;
    partitioning a batch processing job for execution in a plurality of batch execution servers from a cluster of computers;
    designating one computer from the cluster of computers as a primary command server, wherein the primary command server oversees and coordinates execution of the batch processing job;
    selecting a second computer from the cluster of computers to serve as a failover command server;
    storing an object data grid structure in the primary command server;
    replicating the object grid structure to create a replicated object grid structure that is stored in the failover command server;
    storing an alarm setpoint, boundaries and executing batch process states for the large bundled job in a second object data grid structure in the primary command server;
    replicating and storing the second object data grid structure in the failover command server;
    in response to the primary command server failing, restarting, by the failover command server, execution of batch processes from the batch processing job in the plurality of batch execution servers utilizing objects within the replicated object grid structure, wherein the execution of the batch processes is performed with processing states of the plurality of batch execution servers at the time of the primary command server failing; and
    in response to the batch processing job being performed on a bundle of execution files that each comprise multiple individual instructions:
        unbundling the bundle of execution files; and
        assigning each of the unbundled execution files to a different computer from the plurality of batch execution servers.

2. The method of claim 1, wherein replicating the object grid structure further comprises creating the replicated object grid structure with real time copies of each object stored in the object grid structure, the method further comprising:
updating the object grid structure at one of: a predetermined time interval and a change in one or more of the objects within the object grid structure; and
coordinating an update of the replicated object grid structure with the updating of the object grid structure such that the replicated object grid structure always has a most-current copy of data found in the object grid structure.

3. The method of claim 1, wherein storing an object grid structure further comprises storing, within the object grid structure, at least one object from among the objects of: waiting batch processes that describe waiting batch processes in the batch processing job that are not executing and executing batch process states, wherein executing batch process states comprise contents of hard and soft architecture states of one or more computers, from the cluster of computers, that are processing currently executing batch processes from the batch processing job.

4. The method of claim 1, further comprising:
in response to the primary command server failing the failover command server:
freezing all of the currently executing batch processes in the plurality of batch execution servers;
interrogating the processing states of the plurality of batch execution servers;
determining when the freezing of all of the currently executing batch processes has caused a fault in one of the plurality of batch execution servers; and
in response to determining that the freezing of all of the currently executing batch processes has caused a fault in one of the plurality of batch execution servers:
repairing the fault in the one of the plurality of batch execution servers using the replicated object grid structure to create a repaired batch process; and
restarting the repaired batch process.

5. The method of claim 1, wherein storing an object grid structure further comprises storing, within the object grid structure, at least one of:
the alarm setpoint, wherein the alarm setpoint describes a quantity of accumulated unexecuted work units, in the batch processing job, which will cause an alarm to be generated; and
one or more boundaries that describe where the batch processing job can be stored within a system memory of the primary command server.

6. The method of claim 5, wherein the one or more boundaries are subdivided into accounts boundaries, transaction boundaries and physical size boundaries, wherein the accounts boundaries define locations in the system memory for listing customers who are utilizing the batch processing job, the transaction boundaries define locations in the system memory in which batch processes are prohibited from being stored, and wherein the physical size boundaries define locations in the system memory where the batch processes are stored.

7. A system comprising:
at least one processor;
a data bus coupled to the at least one processor;
a memory coupled to the at least one processor via the data bus; and
a computer-usable medium embodying computer program code for to managing a batch processing job, the computer program code comprising instructions that are loaded onto the memory and executed by the at least one processor to cause the at least one processor to:
bundle a set of small batch jobs into a large bundled job;
partition a batch processing job for execution in a plurality of batch execution servers from a cluster of computers;
designate one computer from the cluster of computers as a primary command server, wherein the primary command server oversees and coordinates execution of the batch processing job;
select a second computer from the cluster of computers to serve as a failover command server;
store an object data grid structure in the primary command server;
replicate the object grid structure to create a replicated object grid structure that is stored in the failover command server;
store an alarm setpoint, boundaries and executing batch process states for the large bundled job in a second object data grid structure in the primary command server;
replicate and store the second object data grid structure in the failover command server;
in response to the primary command server failing, restart, by the failover command server, execution of batch processes from the batch processing job in the plurality of batch execution servers utilizing objects within the replicated object grid structure, wherein the execution of the batch processes is performed with processing states of the plurality of batch execution servers at the time of the primary command server failing; and
in response to the batch processing job being performed on a bundle of execution files that each comprise multiple individual instructions:
unbundle the bundle of execution files; and
assign each of the unbundled execution files to a different computer from the plurality of batch execution servers.

8. The system of claim 7, wherein the instructions replicating the object grid structure further comprise instructions that cause the processor to create the replicated object grid structure with real time copies of each object stored in the object grid structure, the instructions further comprising instructions that cause the processor to:
update the object grid structure at one of: a predetermined time interval and a change in one or more of the objects within the object grid structure; and
coordinate an update of the replicated object grid structure with the updating of the object grid structure such that the replicated object grid structure always has a most-current copy of data found in the object grid structure.

9. The system of claim 7, wherein the instructions for storing an object grid structure are further configured to cause the processor to: store, within the object grid structure, at least one object from among the objects of: waiting batch processes that describe waiting batch processes in the batch processing job that are not executing and executing batch process states, which comprise contents of hard and soft architecture states of one or more computers, from the cluster of computers, that are processing currently executing batch processes from the batch processing job.

10. The system of claim 7, wherein the instructions are further configured to cause the processor to:
in response to the primary command server failing the failover command server:
freezing all of the currently executing batch processes in the plurality of batch execution servers;

interrogating the processing states of the plurality of batch execution servers;
determining when the freezing of all of the currently executing batch processes has caused a fault in one of the plurality of batch execution servers; and
in response to determining that the freezing of all of the currently executing batch processes has caused a fault in one of the plurality of batch execution servers:
repairing the fault in the one of the plurality of batch execution servers using the replicated object grid structure to create a repaired batch process; and
restarting the repaired batch process.

11. The system of claim 7, wherein the instructions for storing an object grid structure are further configured to cause the processor to store, within the object grid structure, at least one of:
the alarm setpoint, wherein the alarm setpoint describes a quantity of accumulated unexecuted work units, in the batch processing job, which will cause an alarm to be generated; and
one or more boundaries that describe where the batch processing job can be stored within a system memory of the primary command server.

12. The system of claim 11, wherein the one or more boundaries are subdivided into accounts boundaries, transaction boundaries and physical size boundaries, wherein the accounts boundaries define locations in the system memory for listing customers who are utilizing the batch processing job, the transaction boundaries define locations in the system memory in which batch processes are prohibited from being stored, and wherein the physical size boundaries define locations in the system memory where the batch processes are stored.

13. A computer program product for managing a batch processing job, the computer program product comprising:
a non-transitory computer usable storage device having computer usable program code stored thereon, the computer usable program code comprising computer usable program code configured for:
bundling a set of small batch jobs into a large bundled job;
partitioning a batch processing job for execution in a plurality of batch execution servers from a cluster of computers;
designating one computer from the cluster of computers as a primary command server, wherein the primary command server oversees and coordinates execution of the batch processing job;
selecting a second computer from the cluster of computers to serve as a failover command server;
storing an object data grid structure in the primary command server;
replicating the object grid structure to create a replicated object grid structure that is stored in the failover command server;
storing an alarm setpoint, boundaries and executing batch process states for the large bundled job in a second object data grid structure in the primary command server;
replicating and storing the second object data grid structure in the failover command server;
in response to the primary command server failing, restarting, by the failover command server, execution of batch processes from the batch processing job in the plurality of batch execution servers utilizing objects within the replicated object grid structure, wherein the execution of the batch processes is performed with processing states of the plurality of batch execution servers at the time of the primary command server failing; and
in response to the batch processing job being performed on a bundle of execution files that each comprise multiple individual instructions:
unbundling the bundle of execution files; and
assigning each of the unbundled execution files to a different computer from the plurality of batch execution servers.

14. The computer program product of claim 13, wherein the computer usable program code for replicating the object grid structure further comprises code configured for creating the replicated object grid structure with real time copies of each object stored in the object grid structure, the computer usable program code further comprising code configured for:
updating the object grid structure at one of: a predetermined time interval and a change in one or more of the objects within the object grid structure; and
coordinating an update of the replicated object grid structure with the updating of the object grid structure such that the replicated object grid structure always has a most-current copy of data found in the object grid structure.

15. The computer program product of claim 13, wherein computer usable program code configured for storing an object grid structure are further configured for storing, within the object grid structure, at least one object from among the objects of: waiting batch processes that describe waiting batch processes in the batch processing job that are not executing and executing batch process states, wherein executing batch process states comprise contents of hard and soft architecture states of one or more computers, from the cluster of computers, that are processing currently executing batch processes from the batch processing job.

16. The computer program product of claim 13, further comprising computer usable program code configured for:
in response to the primary command server failing the failover command server:
freezing all of the currently executing batch processes in the plurality of batch execution servers;
interrogating the processing states of the plurality of batch execution servers;
determining when the freezing of all of the currently executing batch processes has caused a fault in one of the plurality of batch execution servers; and
in response to determining that the freezing of all of the currently executing batch processes has caused a fault in one of the plurality of batch execution servers:
repairing the fault in the one of the plurality of batch execution servers using the replicated object grid structure to create a repaired batch process; and
restarting the repaired batch process.

17. The computer program product of claim 13, wherein the computer usable program code for storing an object grid structure further comprises program code for storing, within the object grid structure, at least one of:
the alarm setpoint, wherein the alarm setpoint describes a quantity of accumulated unexecuted work units, in the batch processing job, which will cause an alarm to be generated; and
one or more boundaries that describe where the batch processing job can be stored within a system memory of the primary command server, and wherein the one or more boundaries are subdivided into accounts boundaries, transaction boundaries and physical size boundaries, wherein the accounts boundaries define locations in the system memory for listing customers who are utilizing the batch processing job, the transaction boundaries define locations in the system memory in which batch processes are prohibited from being stored, and wherein the physical size boundaries define locations in the system memory where the batch processes are stored.

* * * * *